US008495324B2

(12) United States Patent
Kirvan et al.

(10) Patent No.: US 8,495,324 B2
(45) Date of Patent: Jul. 23, 2013

(54) METHODS AND STRUCTURE FOR TUNING STORAGE SYSTEM PERFORMANCE BASED ON DETECTED PATTERNS OF BLOCK LEVEL USAGE

(75) Inventors: Scott W. Kirvan, Austin, TX (US); Yanling Qi, Austin, TX (US)

(73) Assignee: LSI Corporation, San Jose, CA (US)

( * ) Notice: Subject to any disclaimer, the term of this patent is extended or adjusted under 35 U.S.C. 154(b) by 430 days.

(21) Appl. No.: 12/947,617

(22) Filed: Nov. 16, 2010

(65) Prior Publication Data

US 2012/0124319 A1 May 17, 2012

(51) Int. Cl.
*G06F 12/00* (2006.01)

(52) U.S. Cl.
USPC ........... 711/165; 711/118; 711/156; 711/170; 713/100

(58) Field of Classification Search
USPC .................. 711/165, 118, 156, 170; 713/100
See application file for complete search history.

(56) References Cited

U.S. PATENT DOCUMENTS

| | | | | |
|---|---|---|---|---|
| 7,308,463 B2 * | 12/2007 | Taulbee et al. | ........................ | 1/1 |
| 7,529,887 B1 * | 5/2009 | Haase et al. | .................. | 711/114 |
| 7,568,080 B2 * | 7/2009 | Prahlad et al. | ................ | 711/162 |
| 7,596,713 B2 * | 9/2009 | Mani-Meitav et al. | ...... | 714/6.32 |
| 7,873,806 B2 * | 1/2011 | Prahlad et al. | ................ | 711/162 |
| 7,941,406 B2 * | 5/2011 | Sudhakar | ....................... | 707/657 |
| 8,037,234 B2 * | 10/2011 | Yu et al. | ......................... | 711/103 |
| 8,073,899 B2 * | 12/2011 | Grier et al. | .................... | 709/203 |
| 8,140,794 B2 * | 3/2012 | Prahlad et al. | ................ | 711/162 |
| 8,176,238 B2 * | 5/2012 | Yu et al. | ......................... | 711/103 |
| 8,266,367 B2 * | 9/2012 | Yu et al. | ......................... | 711/103 |
| 8,341,332 B2 * | 12/2012 | Ma et al. | ......................... | 711/103 |
| 8,341,350 B2 * | 12/2012 | Jess et al. | ....................... | 711/114 |
| 2004/0078641 A1 * | 4/2004 | Fleischmann | ..................... | 714/6 |
| 2004/0250033 A1 * | 12/2004 | Prahlad et al. | ................ | 711/162 |
| 2005/0015475 A1 | 1/2005 | Fujita et al. | | |
| 2005/0216788 A1 * | 9/2005 | Mani-Meitav et al. | ........... | 714/6 |
| 2006/0242356 A1 | 10/2006 | Mogi et al. | | |
| 2008/0320214 A1 * | 12/2008 | Ma et al. | ......................... | 711/103 |
| 2009/0037652 A1 * | 2/2009 | Yu et al. | ......................... | 711/103 |
| 2009/0204872 A1 * | 8/2009 | Yu et al. | ......................... | 714/773 |
| 2009/0228669 A1 | 9/2009 | Slesarev et al. | | |
| 2009/0240873 A1 * | 9/2009 | Yu et al. | ......................... | 711/103 |

(Continued)

OTHER PUBLICATIONS

Townsend et al., "Optimizing and Protecting Storage with Oracle Database 11g Release 2," Nov. 2009, Oracle Corporation, California, pp. 1-20.

(Continued)

*Primary Examiner* — Stephen Elmore
(74) *Attorney, Agent, or Firm* — Duft Bornsen & Fettig LLP

(57) ABSTRACT

Methods and structure within a storage system for tuning performance of the storage system based on monitored block level access within the storage system. Block level access, either in cache memory or on the storage devices of the storage system, is monitored to detect patterns of access and/or data that correspond to an identified host system program. Based on the identified host system program, a profile of desired storage device configuration information is selected by the storage system. The profile comprises information identifying optimal configuration of a logical volume used by the corresponding host system program. Reconfiguration options are identified from the profile information and used either to automatically reconfigure the logical volume or are presented to a user to permit the user to select desired options from the reconfiguration options.

19 Claims, 4 Drawing Sheets

U.S. PATENT DOCUMENTS

| | | | |
|---|---|---|---|
| 2009/0271563 A1* | 10/2009 | Gopalan et al. | 711/103 |
| 2009/0307449 A1* | 12/2009 | Prahlad et al. | 711/162 |
| 2010/0070544 A1* | 3/2010 | Gopalan et al. | 707/822 |
| 2011/0131187 A1* | 6/2011 | Prahlad et al. | 707/674 |
| 2011/0213921 A1* | 9/2011 | Yu et al. | 711/103 |
| 2012/0072662 A1* | 3/2012 | Jess et al. | 711/114 |
| 2012/0179886 A1* | 7/2012 | Prahlad et al. | 711/162 |

OTHER PUBLICATIONS

"Improve Oracle Database and Application Performance," all rights reserved, EMC Corporation, Hopkinton, Massachusetts, Jan. 2009, pp. 1-3.

* cited by examiner

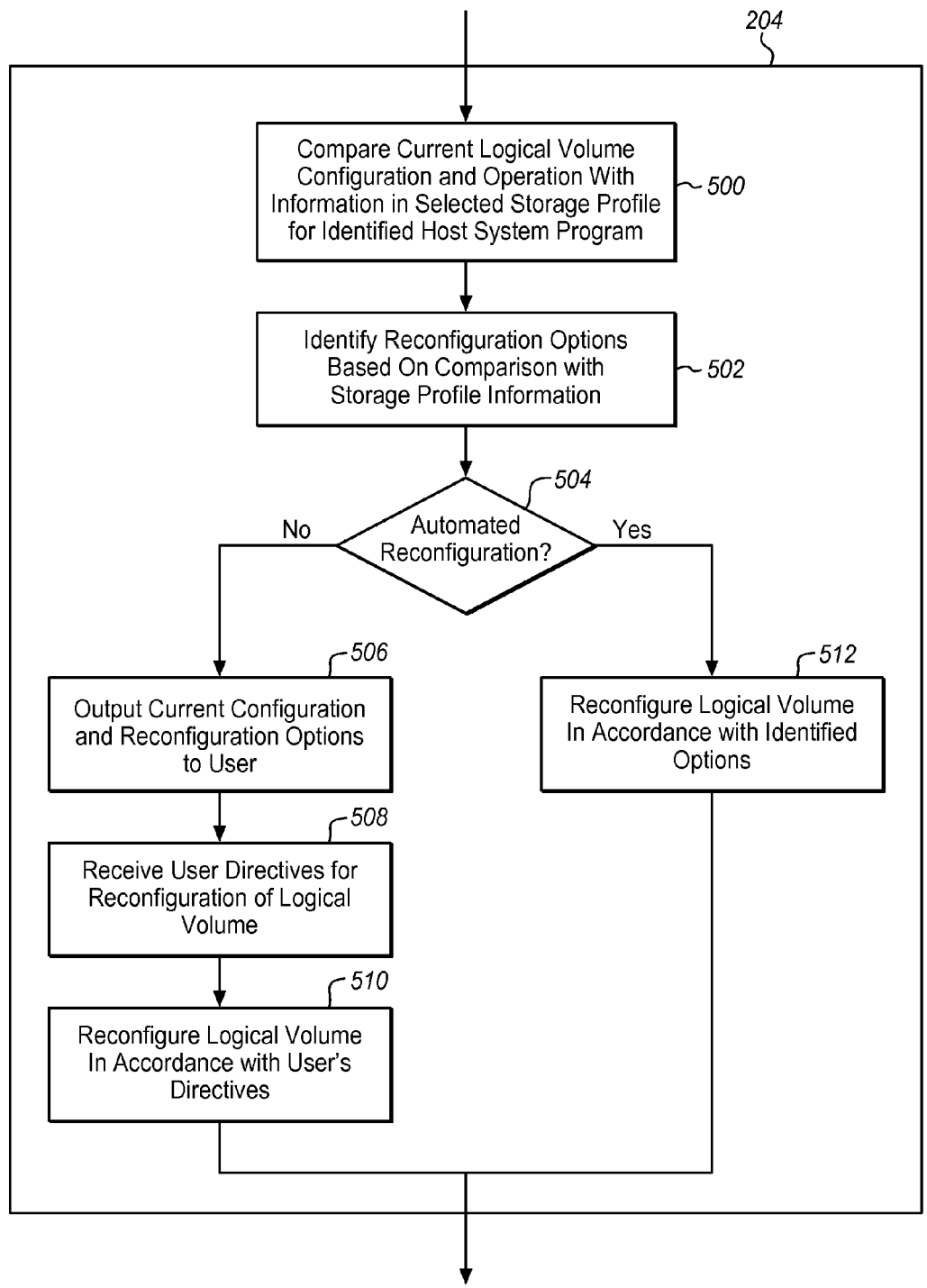

METHODS AND STRUCTURE FOR TUNING STORAGE SYSTEM PERFORMANCE BASED ON DETECTED PATTERNS OF BLOCK LEVEL USAGE

BACKGROUND

1. Field of the Invention

The invention relates generally to storage systems and more specifically relates to methods and structures operable within a storage system to detect patterns of block level usage to enable tuning of the operation of the storage system for identified applications and systems.

2. Discussion of Related Art

Patterns of use of computer storage systems often vary widely depending on the particular system and/or application program that is accessing the storage system. For example, different file systems (often corresponding with different operating systems) may organize file and directory structures on volumes of the storage system in very different ways. Or, for example, different database management systems may organize data and meta-data (e.g., indexing information) differently with respect to one another and all such database systems may organize data and meta-data differently than operating system and file system programs. Still further, virtualized systems (e.g., hypervisor programs that virtualize all hardware in a computing system) may organize user data and meta-data describing volumes in different ways than the underlying systems and applications that may be running under control of the virtualization programs.

Various system programs and application programs present very different needs to storage systems thus making it difficult to achieve optimal performance and reliability for data storage systems. A very skilled system administrator may be aware of these different needs and may organize and configure each logical volume on a storage system in hopes of achieving desired performance and/or reliability goals. Such customized configuration for each of potentially many logical volumes residing on each of potentially many storage systems presents a significant challenge for even the most skilled system administrators. Further, in some cases the system administrator may not even be aware of precisely what system programs and/or application programs are accessing particular logical volumes. Rather, the system administrator may simply be requested by users to create logical volumes having some predetermined storage capacity and may never even be informed about the potential usage of the requested volumes.

Even a skilled system administrator may lack detailed knowledge of storage systems regarding the various options for the underlying logical volume organization and configuration. Further, even a skilled system administrator may lack detailed knowledge of the needs for particular system and/or application programs for storage volume organization/configuration to achieve optimal performance and/or reliability. In view of the difficulties presented to a system administrator hoping to optimize performance of a variety of logical volumes and corresponding programs, it is common that no attempt is even made to provide such customized configuration to achieve optimal performance and/or reliability.

Thus it is an ongoing challenge to improve performance and/or reliability of logical volumes in storage systems based on patterns of usage by a variety of system and application programs.

SUMMARY

The present invention solves the above and other problems, thereby advancing the state of the useful arts, by providing methods and structure for substantially automated tuning of performance of the storage system based on monitored block level access within the storage system. Block level access, either in cache memory or on the storage devices of the storage system, is monitored to detect patterns of access and/or stored data values that correspond to an identified host system program. Based on the identified host system program, a profile of desired storage device configuration information is selected by the storage system. The profile comprises information identifying desired/optimal configuration of a logical volume used by the corresponding host system program. Reconfiguration options are identified from the profile information and used either to automatically reconfigure the logical volume or are presented to a user to permit the user to select desired options from the reconfiguration options.

In one aspect hereof, a method is provided in a storage system for adjusting the storage system operation. The method comprises monitoring block level access to a logical volume stored in the storage system responsive to processing of I/O requests received from one or more attached host systems. The method then identifies a storage profile within the storage system based on the monitored block level access and reconfigures the storage system based on information in the identified storage profile to improve performance of the storage system.

Another aspect hereof provides method operable in a storage system, the storage system comprising a plurality of logical volumes, the method for adjusting the storage system operation to improve performance of one or more of the logical volumes. The method comprises (for each logical volume of the plurality of logical volumes) monitoring block level access to the logical volume responsive to processing of I/O requests received from one or more attached host systems. The method then identifies a program operable on an attached host system, the identified program associated with the logical volume based on the monitored block level access. The method then identifies one or more reconfiguration options for the logical volume based on the monitored block level access. The method then reconfigures the logical volume in accordance with one or more of the identified reconfiguration options to improve performance of the logical volume for I/O requests from the identified program.

Still another aspect hereof provides a storage system comprising a logical volume adapted to store blocks of data. The logical volume is configured from portions of one or more of the plurality of storage devices. The system further comprises an I/O processor coupled with the plurality of storage devices. The I/O processor is adapted to receive an I/O request directed to the logical volume from an attached host system and further adapted to process the I/O request by issuing block access operations to the logical volume. The system also comprises a block I/O monitor coupled with the I/O processor and coupled with the plurality of storage devices. The monitor is adapted to detect block access operations issued by the I/O processor to access blocks of data on the plurality of storage devices. The system still further comprises a detection engine coupled with the block I/O monitor and adapted to detect a pattern of block access operations that identify a host system program that issued the I/O requests corresponding with the detected pattern. The system also comprises a configuration engine coupled with the detection engine. The configuration engine is adapted to determine possible reconfiguration options to improve performance of the storage system in processing I/O requests to the logical volume from the identified host system program. The configuration engine is further adapted to reconfigure the logical volume in accordance with the one or more reconfiguration options.

BRIEF DESCRIPTION OF THE DRAWINGS

FIGS. 2 through 5 are flowcharts describing methods in accordance with features and aspects hereof to provide substantially automated monitoring and analysis of block access patterns and to reconfigure the storage system to improve performance based on the monitored block access.

DETAILED DESCRIPTION OF THE DRAWINGS

Figure 1:
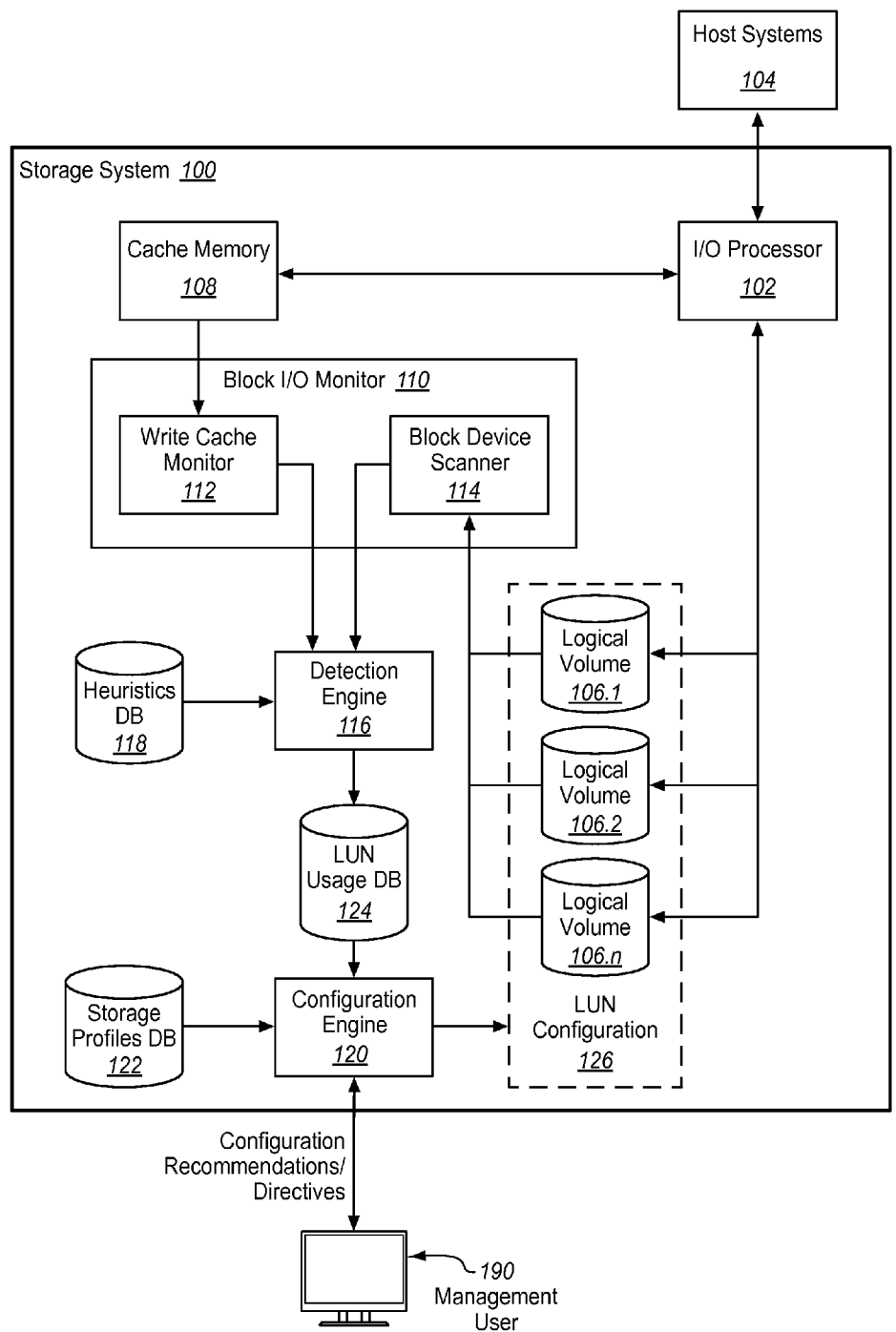
FIG. 1 is a block diagram of an exemplary storage system enhanced in accordance with features and aspects hereof to provide substantially automated monitoring and analysis of block access patterns and to reconfigure the storage system to improve performance based on the monitored block access.

FIG. 1 is a block diagram of an exemplary storage system 100 enhanced in accordance with features and aspects hereof to provide for substantially automated reconfiguration of logical volumes based on detected patterns of block level access to the logical volumes of the storage system. Storage system 100 receives I/O requests from one or more attached host systems 104. Each I/O request is directed to a specified logical volume 106.1 through 106.n. Storage system 100 comprises I/O processor 102 coupled with host systems 104 and coupled with logical volumes 106.1 through 106.n. I/O processor 102 is adapted to process received I/O requests for reading and writing data at identified locations on identified logical volumes 106.1 through 106.n. I/O processor 102 typically comprises a programmable general or special purpose processor (e.g., a CPU not shown) as well as associated program and data memory (not shown) for executing programmed instructions to process received I/O requests. In addition, as well known in the art, I/O processor 102 may further comprise numerous custom circuits specifically adapted to aid in the processing of I/O requests (e.g., DMA co-processors, RAID management assist circuits, etc.).

In processing an I/O request, I/O processor 102 performs block level operations to access data on an identified logical volume 106.1 through 106.n coupled with I/O processor 102 (i.e., block level read and write operations). The block level access operations typically identify a starting logical block address on an identified logical volume and an extent or size of the block level operations to be performed as well as associated data where the block level operations comprises a write operation.

Storage system 100 also comprises cache memory 108 coupled with I/O processor 102. As is well known in the art, I/O processor 102 utilizes cache memory 108 to improve performance of its I/O request processing. Blocks of data written to an identified logical volume by I/O processor 102 may also be stored in cache memory 108 such that subsequent read I/O requests may be more rapidly performed by I/O processor 102 through block level access to cache memory 108 rather than slower access to the storage devices of the identified logical volume. Cache memory 108 may comprise any suitable memory components including, for example, high speed static or dynamic RAM components.

Logical volumes 106.1 through 106.n each comprise portions of one or more storage devices of storage system 100. The storage devices (not shown) that comprise a logical volume 106.1 through 106.n may be any suitable device for persistent storage of data including, for example, magnetic and optical disk drives, semiconductor storage devices (e.g., RAM disks or flash drives), etc. I/O processor 102 generally performs mapping of logical addresses of an I/O request associated with an identified logical volume to corresponding physical addresses on the one or more physical storage devices that comprise the identified logical volume.

In accordance with features and aspects hereof, storage system 100 further comprises a number of components adapted to: monitor the block level access by I/O processor 102, to detect patterns in the monitored block level access associated with a host program, and to reconfigure (or recommend reconfiguration of) an identified logical volume based on desirable or optimal parameters specified for the identified, associated host system program. In particular, system 100 comprises block I/O monitor 110 adapted to detect block level access operations issued by I/O processor 102 to access blocks of data associated with the logical volumes 106.1 through 106.n. In one exemplary embodiment, block I/O monitor 110 may further comprise write cache monitor 112 specifically adapted to monitor block level access by I/O processor 102 in cache memory 108. Block I/O monitor may further comprise block device scanner 114 adapted to scan blocks on logical volumes 106.1 through 106.n accessed by I/O processor 102.

System 100 further comprises detection engine 116 coupled with block I/O monitor 110 and adapted to detect patterns in the block level access information provided by block I/O monitor 110. In particular, detection engine 116 detects patterns in the location (logical block addresses) and size of block accesses as well as particular data patterns in the data associated with particular block accesses. Detection engine 116 utilizes a variety of heuristic rules to identify a particular host system program (e.g., operating systems and/or application program) that matches detected patterns of block access. In one exemplary embodiment, detection engine 116 may be coupled with heuristics database 118 used to store various patterns defining heuristic rules applied by detection engine 116 to identify a host system program based on the pattern of block accesses.

Exemplary heuristic rules may be as follows:
VMWare VMFS writes a volume header to each volume that it owns. The Logical Unit Number (LUN) is stored at offset 0x10000E from the beginning of the volume. The volume capacity is stored at 0x10005F-0x100062. Detecting these items at these locations indicates that VMWare ESX is the operating system and that VMFS is managing the volume.

An Oracle Clustered File System (OCFS) volume header starts at the first sector of the volume. Starting in byte 9 is a signature that contains the ASCII string "OracleCFS". Detecting this string in this location indicates that the volume is being used by Oracle.

System 100 may further comprise configuration engine 120 coupled with detection engine 116 to receive identification of the host system program detected by operation of detection engine 116. Responsive to receipt of the information identifying the host system program, configuration engine 120 determines one or more possible reconfiguration options to improve performance of the storage system in processing I/O requests directed to a logical volume from the identified host system program. In some exemplary embodiments, configuration engine 120 may automatically reconfigure aspects of one or more logical volumes 106.1 through 106.n in accordance with one or more of the identified reconfiguration options. In other exemplary embodiments, configuration engine 120 may output identified reconfiguration options to a management user 190 and await responsive input from management user 190 indicating a selected subset of the possible reconfiguration options. In one exemplary embodiment, configuration engine 120 may be coupled with storage profiles database 122 used to store a plurality of storage profiles each associated with one of a plurality of host system programs. Each storage profile identifies any number of desirable or optimal configuration parameters associated with a logical unit to be utilized by a corresponding identified host system program.

A storage profile stored in storage profile database 122 may include parameters such as:

quality of service attributes for the logical volume, geometric characteristics of the logical volume, local backup characteristics of the logical volume, storage policies for the logical volume, application specific interfaces for the logical volume, and common host system program operations for the logical volume.

Those of ordinary skill in the art will readily recognize numerous additional and equivalent parameters that may be specified in a storage profile for an associated host system program. In one exemplary embodiment, information used to create such storage profiles may be derived from published specifications regarding a host system program. In other embodiments, information used to create storage profiles may be derived from empirical data gathered by management user 190 or otherwise automatically gathered by operation of storage system 100.

Storage profiles (also referred to herein as "templates") may define any number of parameters relating to preferred, desired, or optimal configuration and operation of a logical volume associated with a corresponding host system program. In one exemplary embodiment, the parameters in a storage profile may be encoded as eXtensible Markup Language (XML) tags each defining a corresponding parameter and potentially grouped by common types or other logical groupings of parameters. By way of example, VMWare's vSphere environment is widely used and typical in the sense that it exhibits storage usage characteristics that can be exploited to enhance performance and simplify the end-user experience. These storage usage characteristics form the basis of the information kept in the vSphere application template. An exemplary VMWare vSphere storage profile (encoded in XML format) may be as follows:

```
<APPLICATION>
    <QOS>
        <PKG REDUNDANCY>2 </PKG REDUNDANCY>
        <DATA REDUNDANCY> 1</DATA REDUNDANCY>
        <SEGMENT SIZE>128 </SEGMENT SIZE>
        <STORAGE TIER>2 </STORAGE TIER>
        <READ CACHE>Yes</READ CACHE>
        <WRITE CACHE>No</WRITE CACHE>
        <READ AHEAD>2</READ AHEAD>
    </QOS>
    <PREF>
        <THIN PROVISION>yes</THIN PROVISION>
        <RECOVERY POINTS>
            <FREQ>Daily</FREQ>
            <RETAIN>30</RETAIN>
        </RECOVERY POINTS>
        <HOST TYPE>ESX</HOST TYPE>
        <SUB LUN OPTIMIZATIONS>Yes
        </SUB LUN OPTIMIZATIONS>
        <WS-MAN>Disable</WS-MAN>
        <VASA>Enable</VASA>
        <CIM-XML>Enable</CIM-XML>
        <REST>Disable</REST>
        <MULTI-PATH>Active-Active</MULTI-PATH>
```

-continued

```
    </PREF>
    <USER OPERATIONS>
        <OP>Create From Existing VM</OP>
        <OP>Migrate VM</OP>
        <OP>Import Physical Hosts</OP>
        <OP>Import Virtual Machines</OP>
    </USER OPERATIONS>
</APPLICATION>
```

In one exemplary embodiment, storage system 100 further comprises LUN (logical volume) usage database 124 coupled between detection engine 116 and configuration engine 120. LUN usage database 124 may be used to organize/structure the block access to reveal pattern information and associated information identifying a host system program that matches certain patterns of block access.

Functions provided by block I/O monitor 110, detection engine 116, and configuration engine 120 may be implemented as programmed features operable within the same general or special purpose processor described above with respect to I/O processor 102. In other embodiments, a separate general or special purpose processor (not shown) may be provided within storage system 100 along with corresponding programmed instructions to perform the functions of block I/O monitor 110, detection engine 116, and configuration engine 120. In still other exemplary embodiments, the functions of block I/O monitor 110, detection engine 116, and configuration engine 120 may be implemented as custom designed circuitry within storage system 100 designed to operate in cooperation with I/O processor 102 to monitor block level access, to heuristically detect patterns in the block level access that match an identified host system program, and to reconfigure a logical volume associated with the identified host system program to improve performance of storage system 100.

Those of ordinary skill in the art will readily recognize numerous additional and equivalent elements in a fully functional storage system 100. Such additional and equivalent elements are omitted herein for simplicity and brevity of this discussion.

Figure 2:
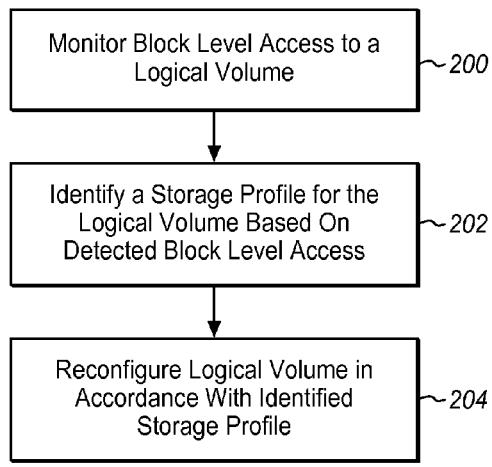

FIG. 2 is a flowchart describing an exemplary method for reconfiguring a logical volume of a storage system based on detecting patterns in monitored block level access matching an identified host system program in accordance with features and aspects hereof. The method of FIG. 2 may be operable in, for example, storage system 100 of FIG. 1 and more specifically within a general or special purpose processor or custom-designed logic circuits within storage system 100. Step 200 represents monitoring of block level access to an identified logical volume. Monitoring processing may be essentially a continuous process operating as a programmed background task or as an assist circuit operable within storage system substantially in parallel with processing of I/O requests. As noted above, monitoring may include monitoring of block level access to a cache memory within the storage system as well as monitoring or scanning of data blocks on storage devices that comprise the logical volume. As noted above, the monitoring of step 200 may include monitoring of the addresses of blocks being accessed as well as data stored in the monitored block accesses. The information gathered by the monitoring of step 200 is then utilized in step 202 to identify a host system program (e.g., operating system and/or application program) that matches a pattern detected in the monitored block level access information. In addition, step 202 identifies a storage profile associated with the identified host system program that matched the pattern of block level access. As noted above the identified storage profile provides information regarding desired or optimal configuration and/or operational parameters for a logical volume utilized by the corresponding identified host system program. The identified storage profile is then utilized at step 204 to reconfigure the logical volume if needed. As discussed further herein below, reconfiguration processing of step 204 may be fully automated within the storage system or may involve administrative user interaction to select from possible reconfiguration options recommended to the user by processing step 204.

Though the method of FIG. 2 is expressed in terms of monitoring and reconfiguring a single logical volume, those of ordinary skill in the art will readily recognize that multiple such methods may be simultaneously/concurrently operable within a storage system to monitor and potentially reconfigure all logical volumes under control of the storage system.

Figure 3:
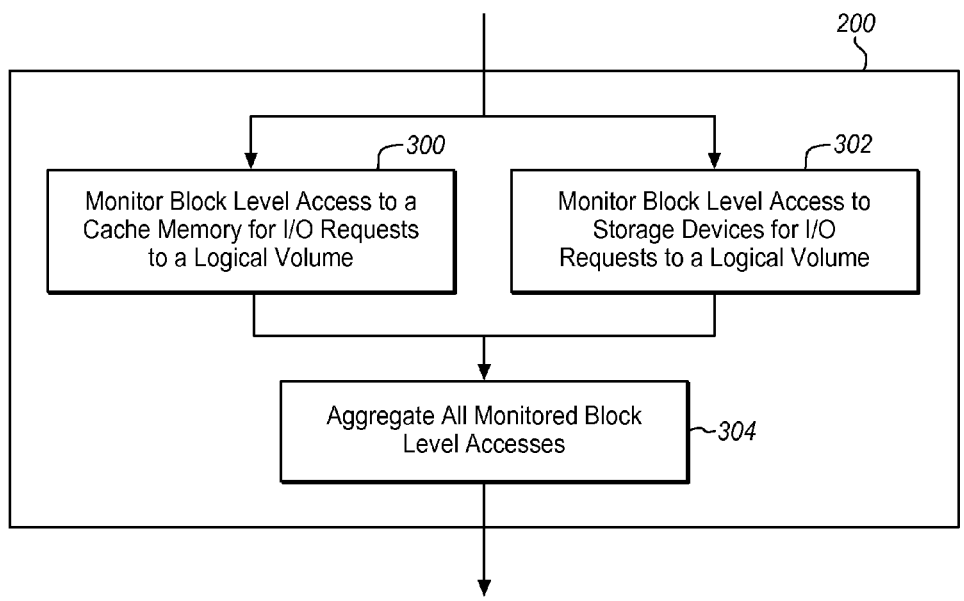

FIG. 3 is a flowchart providing exemplary additional details of the processing of step 200 of FIG. 2 to monitor block level access directed to an identified logical volume. Either or both of steps 300 and 302 may be performed to monitor block level access relating to the processing of I/O requests directed to a logical volume. At step 300, the storage system monitors block level access to a cache memory utilized by an I/O processor of the storage system. To improve write I/O request performance, most block storage systems store application write I/O data in a write cache and respond with a write-command completion immediately. The "dirty" write-cache buffer (data written to cache but not yet written to the persistent storage devices of the logical volume) is flushed to the persistent media at a later time. Logical volume provisioning by a host system program (e.g., disk partitioning, file system creation, logical volume creation, virtual disk creation, etc.) is transformed into write I/O requests to the storage system. The write cache monitor of the system at step 300 observes the cache write buffer and saves volume identifiers and LBA ranges for the write operations it observes. The processing of this step 300 is also sometimes referred to as "on-the-fly" LUN usage detection. To avoid delaying write I/O request completion, processing of step 300 may be implemented as programmed instructions coordinated with the I/O request processing as part of the dirty-cache-flush operation. Processing of step 300 provides real-time detection of block level access as reflected in cache memory utilization and may also detect patterns of block level access by the host system programs that use the logical volume.

Step 302 scans the data stored on the storage devices that comprise the logical volume. Processing of step 302 may be implemented with carrying levels or depth of scanning such as "shallow", "medium" and "deep". When set at the shallow scanning level, step 302 can quickly complete its scanning tasks by scanning well-known LBA regions associated with various host system programs. This shallow level scanning operation may include the beginning and end of a logical volume for partition table discovery, and/or the beginning and end of partition boundaries for filesystem and logical volume metadata discovery. Operating system boot devices can also be discovered by scanning the boot record of a logical volume. At the medium scanning level, metadata belonging to host system programs using the logical volume can be further scanned and analyzed. The medium level scanning by step 302 may also discover less common host system programs. Deep level scanning by step 302 provides the opportunity to perform data mining on a volume.

At step 304, all such monitored/scanned block access information may be aggregated for further processing to identify patterns in the monitored block access indicating a particular host system program utilizing the logical volume. As noted above, the aggregated block access information may be stored in a buffer or database to permit subsequent analysis of the block access patterns over a period of time.

Figure 4:
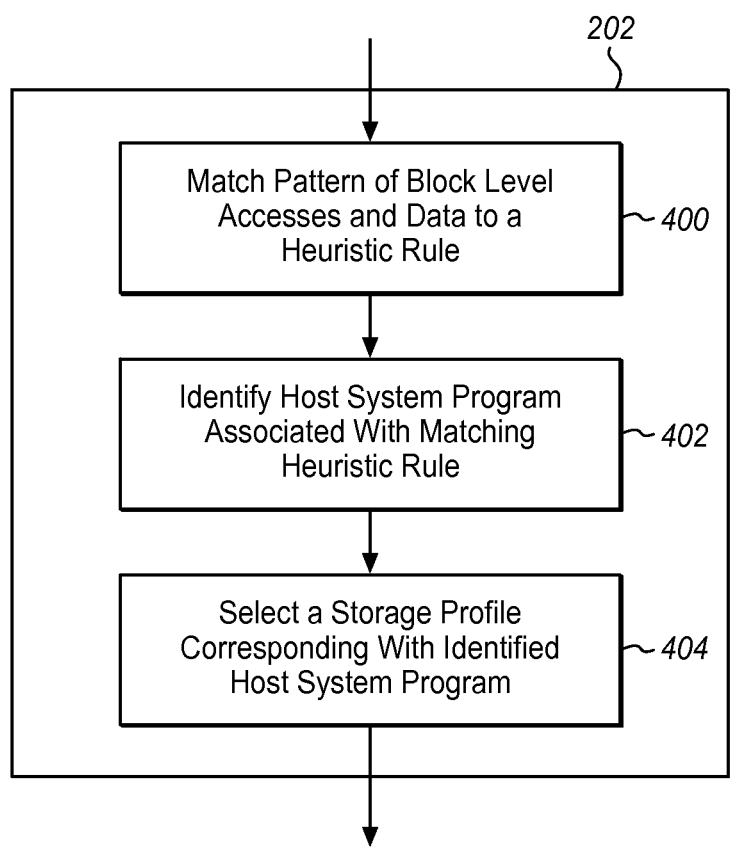

FIG. 4 is a flowchart describing exemplary additional details of the processing of step 202 of FIG. 2 to identify a storage profile based on the detected block level access. At step 400, the gathered block access information is analyzed to detect/match patterns in the logical block addresses accessed and/or in the data values written to certain logical block addresses of particular interest. Heuristic rules may be stored in a database. Each rule may include information required to identify an associated host system program by looking at the data stored in the logical volume and/or the patterns of block addresses accessed. In general a heuristic rule may take the form of an LBA range and/or relative LBA range from an anchor point, and known data byte patterns in those ranges. Other ad-hoc methods will be readily apparent to those of ordinary skill in the art. Separating the heuristic rules from the pattern detection logic simplifies the addition of new host system programs to be detected. For example, the filesystem associated with typical Windows, MAC and Linux operating system programs may utilize certain logical block addresses for storing directory information or other metadata associated with data files. Or, for example, an Oracle database host system program may exhibit certain patterns of block level access and/or particular signatures of data stored in particular logical block addresses of interest. The specific logical block addresses and/or data patterns of interest (i.e., the heuristic rules) may be derived from documentation or specifications associated with each host system program. In other embodiments, the heuristic rules corresponding to particular host system programs may be derived from empirical data gathered by end users or manufacturers of the storage system.

Responsive to matching a pattern of block level accesses and/or data values according to a heuristic rule, step 402 identifies the host system program associated with the heuristic rule that matched the pattern of block level accesses and/or data values. When a logical volume is detected as being associated with a particular, identified host system program, that mapping information may be stored (e.g., in the LUN usage database of FIG. 1) for later use in analyzing performance and configuration of a logical volume (thus avoiding repeated detection and matching of patterns). In some embodiments, the processing of steps 400 and 402 may be merged with other scanning activities such as drive media error detection or parity error detection.

Step 404 then selects a storage profile corresponding with the identified host system program. As noted above, the storage profile provides parameters for desired or optimal configuration/operation of a logical unit utilized by the identified host system program.

FIG. 5 is a flowchart describing exemplary additional details of the processing of step 204 of FIG. 2 to reconfigure a logical volume in accordance with parameters in an identified storage profile. At step 500, the current configuration and operational parameters associated with the logical volume are compared with desired or optimal parameters in the selected storage profile corresponding to the identified host system program. At step 502 particular reconfiguration options are identified based on the comparison of the present logical volume configuration/operation with the information in the storage profile. One or more configuration/operational parameters may differ and thus may result in potential reconfiguration options that may be utilized for improving performance of the logical volume as utilized by the identified host system program. At step 504, the storage system determines whether it has been enabled to automatically reconfigure an identified logical volume in accordance with one or more of the identified reconfiguration options. Automated reconfiguration may be enabled for all logical volumes managed by the storage system or may be selectively enabled/disabled for particular logical volumes of the storage system. If automated reconfiguration is not enabled for the storage system, step 506 outputs the current configuration of the logical volume and the identified reconfiguration options to an administrative user. At step 508 the storage system receives input from the user providing information or directives for reconfiguration of the identified logical volume based on the recommendations provided at step 506. At step 510, the storage system reconfigures the identified logical volume in accordance with the user input directives indicating particular reconfiguration to be utilized. If step 504 determines that automated reconfiguration of the logical volume has been enabled, step 512 reconfigures the identified logical volume in accordance with one or more of the identified reconfiguration options.

Those of ordinary skill in the art will readily recognize numerous additional and equivalent steps in the method described by FIGS. 2 through 5. Such additional and equivalent steps are omitted here herein for simplicity and brevity of this discussion.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method operable in a storage system for adjusting the storage system operation, the method comprising:
   monitoring block level access to a logical volume stored in the storage system responsive to processing of I/O requests received from one or more attached host systems;
   identifying a storage profile within the storage system based on the monitored block level access; and
   reconfiguring the storage system based on information in the identified storage profile to improve performance of the storage system.

2. The method of claim 1
   wherein the step of monitoring further comprises:
   monitoring block level access to data blocks of the logical volume stored in a cache memory of the storage system.

3. The method of claim 1
   wherein the step of monitoring further comprises:
   scanning data blocks of the logical volume stored on storage devices of the storage system.

4. The method of claim 1
   wherein the storage profile comprises one or more of:
   quality of service attributes for the logical volume,
   geometric characteristics of the logical volume,
   local backup characteristics of the logical volume,
   storage policies for the logical volume,
   application specific interfaces for the logical volume, and
   common program operations for the logical volume.

5. The method of claim 1
   wherein the step of reconfiguring further comprises:
   outputting recommendations for improved configuration of the logical volume to a user;
   receiving input from the user wherein the input comprises specifications from the user for reconfiguration of the logical volume; and
   reconfiguring the logical volume in accordance with the user's specifications.

6. The method of claim 5
   wherein the step of outputting further comprises:
   outputting information identifying all physical components of the storage system that relate to configuration of the logical volume.

7. The method of claim 1
   wherein the storage profile comprises information identifying a program operable on an attached host system that manages the logical volume,
   the method further comprising:
   outputting event information relating to the logical volume to the identified program, wherein the event information comprises only information relating to the logical volume managed by the identified program.

8. A method operable in a storage system, the storage system comprising a plurality of logical volumes, the method for adjusting the storage system operation to improve performance of one or more of the logical volumes, the method comprising:
   for each logical volume of the plurality of logical volumes, performing the steps of:
   monitoring block level access to the logical volume responsive to processing of I/O requests received from one or more attached host systems;
   identifying a program operable on an attached host system, the identified program associated with the logical volume based on the monitored block level access;
   identifying one or more reconfiguration options for the logical volume based on the monitored block level access; and
   reconfiguring the logical volume in accordance with one or more of the identified reconfiguration options to improve performance of the logical volume for I/O requests from the identified program.

9. The method of claim 8 further comprising:
   outputting the one or more reconfiguration options for the logical volume to a user of the storage system; and
   receiving input from the user selecting one or more reconfiguration options to be applied to the logical volume,
   wherein the step of applying applies the selected one or more reconfiguration options to reconfigure the logical volume.

10. The method of claim 8 further comprising:
    detecting an event within the storage system relating to an identified volume of the plurality of logical volumes; and
    outputting information relating to the detected event to the identified program associated with the identified logical volume.

11. The method of claim 8
    wherein the step of monitoring further comprises:
    monitoring block level access to data blocks of the logical volume stored in a cache memory of the storage system.

12. The method of claim 8
    wherein the step of monitoring further comprises:
    scanning data blocks of the logical volume stored on storage devices of the storage system.

13. A storage system comprising:
a logical volume adapted to store blocks of data, wherein the logical volume is configured from portions of one or more of the plurality of storage devices;
an I/O processor coupled with the plurality of storage devices, the I/O processor adapted to receive an I/O request directed to the logical volume from an attached host system and further adapted to process the I/O request by issuing block access operations to the logical volume;
a block I/O monitor coupled with the I/O processor and coupled with the plurality of storage devices, the monitor adapted to detect block access operations issued by the I/O processor to access blocks of data on the plurality of storage devices;
a detection engine coupled with the block I/O monitor and adapted to detect a pattern of block access operations that identify a host system program that issued the I/O requests corresponding with the detected pattern;
a configuration engine coupled with the detection engine, the configuration engine adapted to determine possible reconfiguration options to improve performance of the storage system in processing I/O requests to the logical volume from the identified host system program, the configuration engine further adapted to reconfigure the logical volume in accordance with the one or more reconfiguration options.

14. The storage system of claim 13 further comprising:
a cache memory adapted to store blocks of data;
wherein the I/O processor is further adapted to process I/O requests by issuing block access operations to the cache memory,
wherein the block I/O monitor is coupled with the cache memory, and
wherein the block I/O monitor is further adapted to detect block access operations issued by the I/O processor to access blocks of data in the cache memory.

15. The storage system of claim 13
wherein the block I/O monitor is further adapted to scan data blocks of the logical volume to detect block access operations issued by the I/O processor to access blocks of data on the logical volume.

16. The storage system of claim 13 further comprising:
a heuristic database coupled with the detection engine, the heuristic database adapted to store one or more heuristic rules associated with block access operations by a corresponding host system program,
wherein the detection engine is further adapted to detect the pattern in accordance with the one or more heuristic rules.

17. The storage system of claim 16
wherein each of the one or more heuristic rules comprises information identifying a range of logical block addresses and a corresponding pattern of data stored in the range of logical block addresses.

18. The storage system of claim 13 further comprising:
a storage profile database coupled with the configuration engine, the storage profile database adapted to store one or more entries, each entry comprising information regarding preferred configuration of a logical volume used by a corresponding host system program,
wherein the configuration engine is further adapted to determine the possible reconfiguration options for the logical volume in accordance with the information in a storage profile database entry corresponding with the host system program identified by the detection engine.

19. The storage system of claim 18
wherein each storage profile database entry comprises information regarding one or more of:
quality of service attributes for the logical volume,
geometric characteristics of the logical volume,
local backup characteristics of the logical volume,
storage policies for the logical volume,
application specific interfaces for the logical volume, and
common host system program operations for the logical volume.

* * * * *